No. 871,835. PATENTED NOV. 26, 1907.
G. P. WACEK.
HARVESTER.
APPLICATION FILED JULY 5, 1907.
2 SHEETS—SHEET 1.
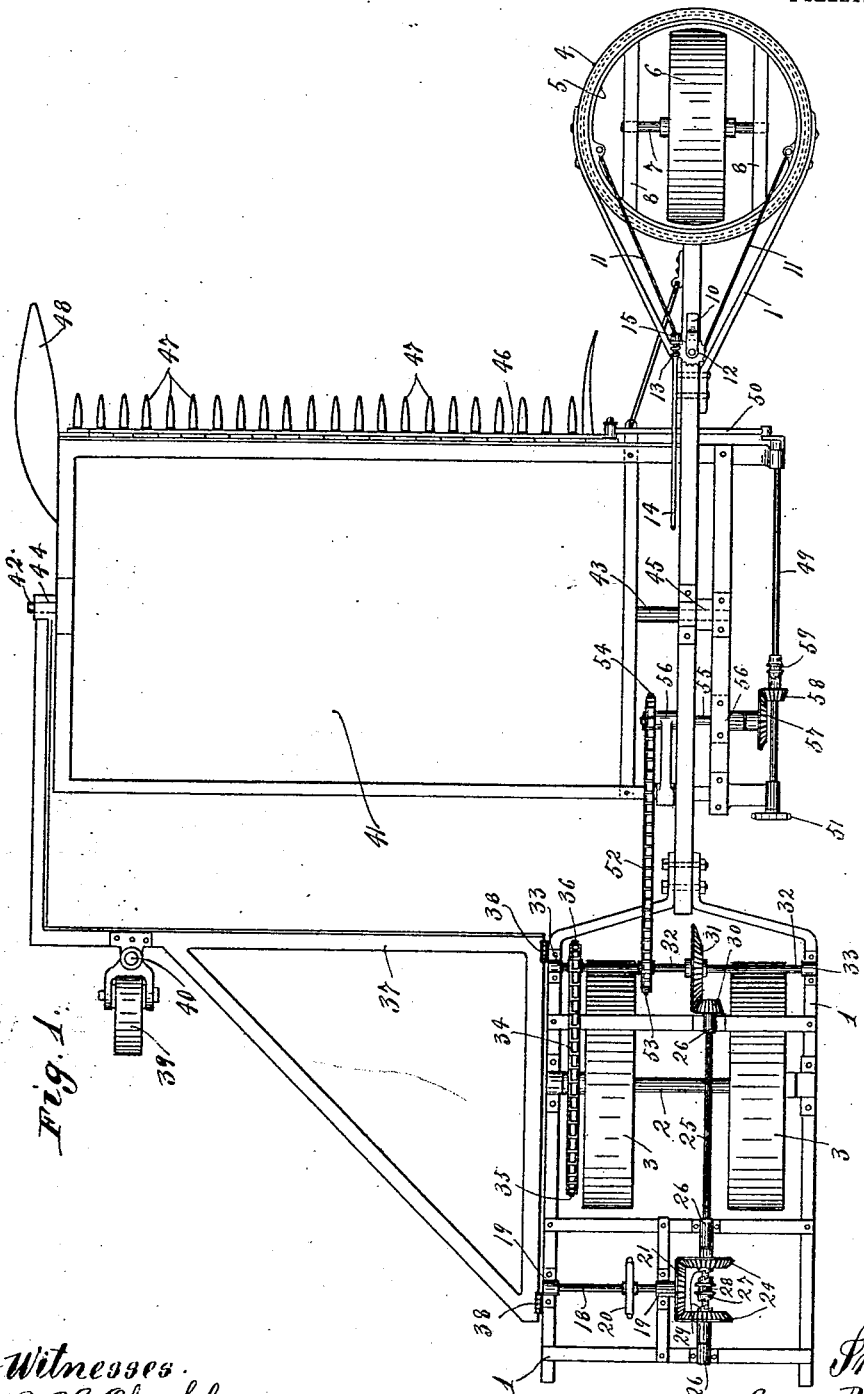
Witnesses
A. H. Opsahl.
L. L. Simpson.
Inventor
George P. Wacek.
By his Attorneys
Williamson & Merchant

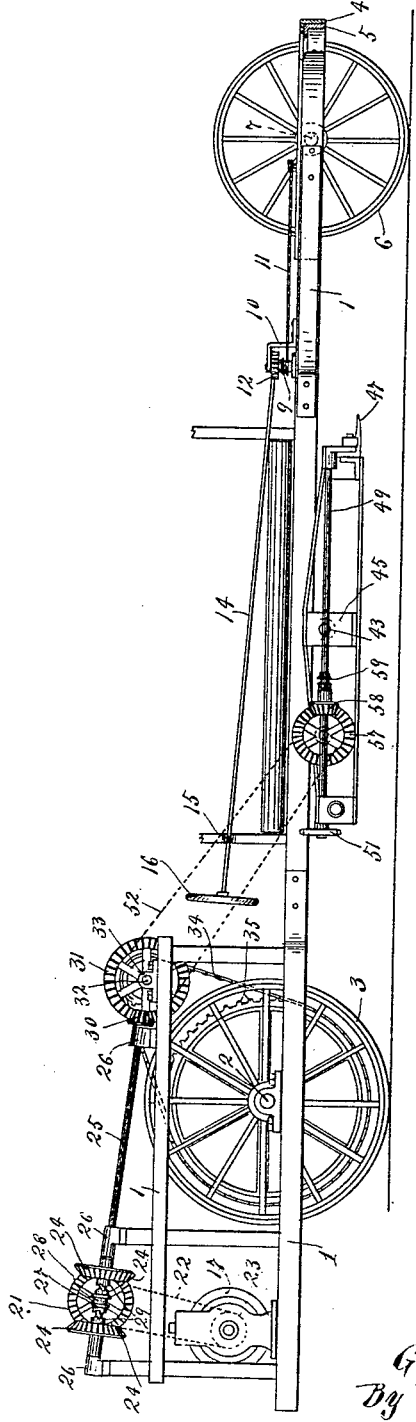

UNITED STATES PATENT OFFICE.

GEORGE P. WACEK, OF OLIVIA, MINNESOTA.

HARVESTER.

No. 871,835.     Specification of Letters Patent.     Patented Nov. 26, 1907.

Application filed July 5, 1907. Serial No. 382,269.

*To all whom it may concern:*

Be it known that I, GEORGE P. WACEK, a citizen of the United States, residing at Olivia, in the county of Renville and State of Minnesota, have invented certain new and useful Improvements in Harvesters; and I do hereby declare the following to be a full, clear, and exact description of the invention, such as will enable others skilled in the art to which it appertains to make and use the same.

My invention relates to harvesters, and has for its object to improve the same in the several particulars hereinafter noted.

The invention consists of the novel devices and combinations of devices hereinafter described and defined in the claims.

The improved harvester is illustrated in the accompanying drawings, wherein like characters indicate like parts throughout the several views.

Referring to the drawings; Figure 1 is a plan view of the harvester, with some parts removed, and other parts broken away; and Fig. 2 is a side elevation of the improved harvester, with some parts removed and other parts broken away.

The numeral 1 indicates the main frame, the numeral 2 the rear axle, and the numeral 3 the traction wheels on the rear axle. If desired, a third traction wheel may be mounted on the rear axle 2 between the traction wheels 3, for use on soft or muddy ground; or, in place of the three traction wheels, a single wide traction wheel may be used. Mounted in the forward end of the main frame 1 is an annular bearing, comprising an upper member 4 rigidly secured to said main frame, and a lower member 5. In practice, anti-friction roller bearing devices, not shown, may be interposed between said upper and lower bearing members. A steering wheel 6 is mounted within the annular bearing on a short shaft 7 mounted in the bearing 8 secured to the said lower member 5. A drum 9 is mounted in a bearing 10 secured to the main frame 1 just back of the steering wheel 6. The intermediate portion of a cable 11 is given several turns around said drum 9, and the free ends of said cable are secured to the lower member 5 approximately 180 degrees apart. To the upper end of the drum 9 is rigidly secured a worm wheel 12. For rotating the worm wheel 12 is a worm 13 rigidly secured to a long rod 14 mounted in bearings 15 secured to the main frame 1. The end of the rod 14, opposite the worm 13, is provided with a hand wheel 16.

As is evident, by turning the hand wheel 16, the steering wheel 6 may be turned either to the left or the right, for the purpose of steering the harvester. For propelling the harvester and operating the harvester mechanism, an explosive engine 17 is shown mounted on the rear portion of the main frame 1, said engine being indicated in diagram. A shaft 18, mounted in bearings 19 secured to the main frame 1, above and a little forward of the explosive engine 17, carries a sprocket wheel 20 and bevel gear 21. A driving chain 22 runs over said sprocket wheel 20 and over and under a sprocket wheel 23 carried by the engine shaft. The chain 22 and sprocket wheel 23 are indicated by dotted lines in Fig. 2. For engagement with the bevel gear 21 is a pair of reversely faced bevel gears 24 loosely mounted on a shaft 25 extending at right angles to the shaft 18, and mounted in bearings 26 secured to the main frame 1. Mounted between the bevel gears 24 on the shaft 25 is a clutch member 27 adapted to slide on said shaft, but held for rotation therewith. Said clutch member is provided with a groove to be engaged by a shipper lever, not shown. Each bevel gear 24 is provided with a half clutch 29 adapted to be engaged by the adjacent toothed end of said sliding clutch member 27. The forwardly projecting end of the shaft 25 is provided with a bevel pinion 30 for engagement with a bevel gear 31 secured to a shaft 32. Said shaft 32 extends parallel with the shaft 18 and is mounted in suitable bearings 33 secured to the main frame 1. A heavy sprocket chain 34 runs over a large gear 35 secured to the rear axle 2 and over a relatively small sprocket wheel 36 carried by the shaft 32.

As is evident from the description just given, by shifting the clutch member 23 into or out of engagement with the half clutches 29 on the bevel gears 24, the traction wheels 3 may be driven in either a forward or backward direction.

As shown in Fig. 1, a supplemental frame 37 is hinged at 38 to the left hand side of the main frame 1 adjacent to the traction wheels. The free end of the supplemental frame 37 is supported by a caster wheel 39 pivotally mounted in a bearing 40 secured to said supplemental frame.

The parts of the harvester shown in the drawings are of the standard or ordinary construction. The numeral 41 indicates the platform, carrying trunnions 42 and 43. The trunnion 42 is mounted in the bearing 44 formed in the free and forwardly projecting end of the supplemental frame 37, and the trunnion 43 is loosely mounted in the link 45 pivotally secured to the intermediate portion of the frame 1. The numeral 46 indicates a sickle, 47 the finger bar, 48 the grain dividing board, 49 the crank shaft, and 50 the pitman connecting the crank shaft 49 and sickle 46. Secured to the rear end of the shaft 49 is a sprocket wheel 51, for the purpose of driving the conveyer, not shown. To drive the crank shaft 49, a sprocket chain 52 runs over a sprocket wheel 53 secured to the shaft 32, and over a sprocket wheel 54 carried by a short shaft 55 mounted in suitable bearings 56 carried by the frame of the harvester. The outwardly projecting end of the shaft 55 is provided with a bevel gear 57. A pinion 58, loosely mounted on the crank shaft 49, meshes with said gear 57, and is provided with a half clutch. Mounted to slide on the shaft 49, but to rotate therewith, is a sliding half clutch 59 adapted to engage the half clutch carried by the pinion 58. The sliding half clutch 59 is provided with a groove adapted to be engaged by a shipper lever, not shown.

Mechanism, not shown, suitable for tilting the platform 41 and holding the same at different angles with respect to the ground, of course, will be provided in actual practice. Said mechanism may be of the ordinary or standard construction. As is evident, the supplemental frame 37 being hinged to the main frame 1, and the trunnion 43 on the platform 41 being loosely mounted in the swinging link 45, the platform and parts carried thereby are free to adjust themselves to any unevenness of the ground. In placing the caster wheel 39 at the rear of the platform 41 and doing away with the grain wheel ordinarily used, prevents the grain from being broken down.

What I claim is:—

1. In a harvester, the combination with a main frame having a steering wheel in front and a traction wheel at the rear, of a supplemental frame hinged to one side of said main frame and provided at its extended portion with a supporting wheel and forwardly projecting arm, and a grain platform supported by the intermediate portion of said main frame and the forwardly extended arm of said supplemental frame, substantially as described.

2. In a harvester, the combination with a main frame having a steering wheel in front and a traction wheel at the rear, of a supplemental frame hinged to one side of the rear portion of said main frame and provided at its outer portion with a supporting wheel and a forwardly projecting arm, and a grain platform pivotally supported at its ends by the intermediate portion of the said main frame and the forwardly projecting arm of said supplemental frame, substantially as described.

3. In a harvester, the combination with a main frame having a steering wheel in front and a traction wheel at the rear, of a supplemental frame hinged to one side of the intermediate portion of said main frame, and provided with a forwardly projecting arm at its free end, a caster wheel applied to and supporting the outer portion of said supplemental frame, a sickle-equipped grain platform supported by the intermediate portion of said main frame and the forwardly projecting arm of said supplemental frame itself, a shaft mounted on the inner end of the said platform, and driving connections from said traction wheel to said shaft, substantially as described.

4. In a harvester, the combination with a main frame having a steering wheel in front and a traction wheel at the rear, of a supplemental frame hinged to one side of the intermediate portion of said main frame, and provided with a forwardly projecting arm at its free end, a caster wheel applied to and supporting the outer portion of said supplemental frame, a sickle-equipped grain platform pivotally supported by the intermediate portion of said main frame and the forwardly projecting arm of said supplemental frame itself, a shaft mounted on the inner end of the said platform, and driving connections from said traction wheel to said shaft, substantially as described.

In testimony whereof I affix my signature in presence of two witnesses

GEORGE P. WACEK.

Witnesses:
E. G. HEINS,
W. J. HEANEY.